US012613844B1

(12) United States Patent
Jacob et al.

(10) Patent No.: US 12,613,844 B1
(45) Date of Patent: Apr. 28, 2026

(54) NONDESTRUCTIVE DATA INFUSION FOR TEST DATA REFRESH

(71) Applicant: Bank of America Corporation, Charlotte, NC (US)

(72) Inventors: Rusk Jacob, Plano, TX (US); Durga Turaga, Plano, TX (US); Parthiban Shanmugam, Charlotte, NC (US); Sunil Mishra, Pennington, NJ (US); Augustine R. Gidla, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/932,914

(22) Filed: Oct. 31, 2024

(51) Int. Cl.
*G06F 16/215* (2019.01)
(52) U.S. Cl.
CPC .................................. *G06F 16/215* (2019.01)
(58) Field of Classification Search
CPC .................................................... G06F 16/215
See application file for complete search history.

(56) References Cited

U.S. PATENT DOCUMENTS

| | | | |
|---|---|---|---|
| 2018/0210817 A1* | 7/2018 | Kelly | G06F 16/27 |
| 2025/0104052 A1* | 3/2025 | Caravetta | G06F 21/6254 |
| 2025/0278576 A1* | 9/2025 | Kumar | G06F 40/30 |

* cited by examiner

*Primary Examiner* — Kavita Stanley
(74) *Attorney, Agent, or Firm* — Weiss & Arons LLP

(57) ABSTRACT

Systems and methods for nondestructive infusion of test data into a lower-level environment ("LLE"). The systems and methods may include a data infusion processor ("DIP"). The DIP may be operable to process test data refresh requests ("TDRRs"). The systems and methods may include an artificial intelligence/machine learning ("AI/ML") processor. The AI/ML processor may be operable to decision, obfuscate, and validate test data. The systems and methods may include a user profile database. The user profile database may be operable to store user profile data. The systems and methods may include a backup database. The backup database may be operable to store test data and data tables. The systems and methods may filter, via the AI/ML processor, requested test data by a selection process. The systems and methods may obfuscate selected test data. The systems and methods may infuse selected test data into the LLE.

20 Claims, 6 Drawing Sheets

DATA INFUSION - ARCHITECTURE

DATA INFUSION - ARCHITECTURE

NONDESTRUCTIVE DATA INFUSION FOR TEST DATA REFRESH

FIELD OF TECHNOLOGY

Aspects of the disclosure relate to nondestructive data infusion for test data refresh.

BACKGROUND OF THE DISCLOSURE

Existing test data refresh processes are cumbersome, complex, manual, and take long times to process. A test data refresh process may replace existing transactions and master data in a quality system with test data from a production-level environment.

Organization testing teams require new data refresh processes to meet their testing requirements. And with the growing financial industry, there is an increased need to be able to add data for testing purposes in lower-level environments ("LLEs") due to new products, funds, and capabilities.

To tackle increasing cybersecurity threats, more robust testing is required. Businesses, operations, data testers, and application owners require new test data to meet project requirements.

There is no process currently capable of placing a piece of data into an LLE that satisfies these business requirements. And manually copying data poses a high threat/risk to data privacy and security. Further, there is no process currently available to infuse a piece of data into an LLE ensuring data integrity, completeness, freshness, and validity.

In addition, the data refresh process is typically a destructive process because it destroys and replaces existing data in the LLE. This may severely impact testing in the LLE as regression scripts and conditioned test data must be continuously re-established for new account populations.

It would therefore be desirable to develop a system capable of provisioning required test data into an LLE (e.g., any piece of data) while ensuring data completeness, integrity, synchronization, and validity.

It would be further desirable to infuse test data into an LLE while maintaining data privacy and security within the system. And it would be even further desirable to ensure data integrity and quality.

It would therefore be desirable to develop a data infusion process that is non-disruptive, nondestructive, and is able to be performed in about real-time (e.g., less than several weeks). It would be further desirable for a system to be able to use infusion data to be supportive of future system needs for data infusion.

SUMMARY OF THE DISCLOSURE

The disclosure provides systems and methods of nondestructive data infusion for enterprise data protection and privacy ("EDPP"). The systems and methods may meet any test data requirements and new business scenarios without disrupting existing systems. The systems and methods may ensure data integrity and maintain data quality.

The systems and methods may be destructive because it wipes away all the existing data in test lanes. This may severely impact testing occurring in the test lanes as regression scripts and conditioned test data must be re-established again for the new account population.

Typically, a test data refresh is done every several years. But because test data refresh is done every several years, new scenarios and/or test data population cannot be made available to a test data refresh tester in a timely manner. And the end-to-end turnaround wait time to perform a test data refresh can be more than 6 months. These challenges may be addressed by an alternative solution to test data refresh, as disclosed herein.

The systems and methods provided may be operable to facilitate the provisioning of data into application test lanes without impacting existing data in the environment. And any EDPP team may leverage the systems and methods (i.e., the disclosed data infusion process) to bypass challenges accompanying a full data refresh.

The systems and methods may include, e.g., the following features. The systems and methods may be operable to add current data as per project/business requirements without interrupting existing business or processes.

Systems and methods may be operable to provide a turnaround time that is faster than other data refresh systems and processes. Systems and methods may be operable to resolve insufficient data pain points. Systems and methods may be operable to reduce data conditioning needs.

The systems and methods may be operable to ensure that existing test data, regression scripts, testing windows, and data retrofits are not impacted. The systems and methods may be operable to leverage multiple technology concepts. The systems and methods may be operable to lower the operational running cost of a data infusion process.

The systems and methods may be operable to ensure a "secure-by-design" system and process. A "secure-by-design" system and process may be incubated end-to-end in a flow that maintains a resilient system and method. The "secure-by-design" system and process may maintain, e.g., all entity security requirements, least privilege, and defense in depth.

The systems and methods may be nondestructive. In the context of this disclosure, the systems and methods being "nondestructive" means that the data infusion system and process may add and/or infuse data (e.g., new user profiles, accounts, etc.) into an LLE, while maintaining an existing data population.

The systems and methods may provide shorter turnaround times. The systems and methods may enable data infusions to occur in less than 6 weeks without the need to execute run-forward cycles.

The systems and methods may enable frequent data infusions. Typically, data infusions may be performed every quarter before the start of a new data release.

The systems and methods may enable user-driven infusions. User-driven infusions may include entities providing infusion data requests when no data is found for new test scenarios.

The systems and methods may enable proactive data addressing. Proactive data addressing may include enabling data infusions that proactively address insufficient data scenarios when baseline test data volumes decrease below a threshold level. Repeated selection requirements may be established.

The systems and methods may enable test data integration. The systems and methods may enable test data integration into any LLE.

The systems and methods may eliminate the need for a full test data refresh. The systems and methods may result in significant cost savings, e.g., millions of dollars annually.

The systems and methods may include a zero-trust architecture. A zero-trust architecture may explicitly verify data infusion into the LLE. The zero-trust architecture may maintain a least privilege access. The zero-trust architecture may maintain a micro segmentation of the test data. The zero-trust architecture may maintain continuous monitoring and validation of the test data infusion.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
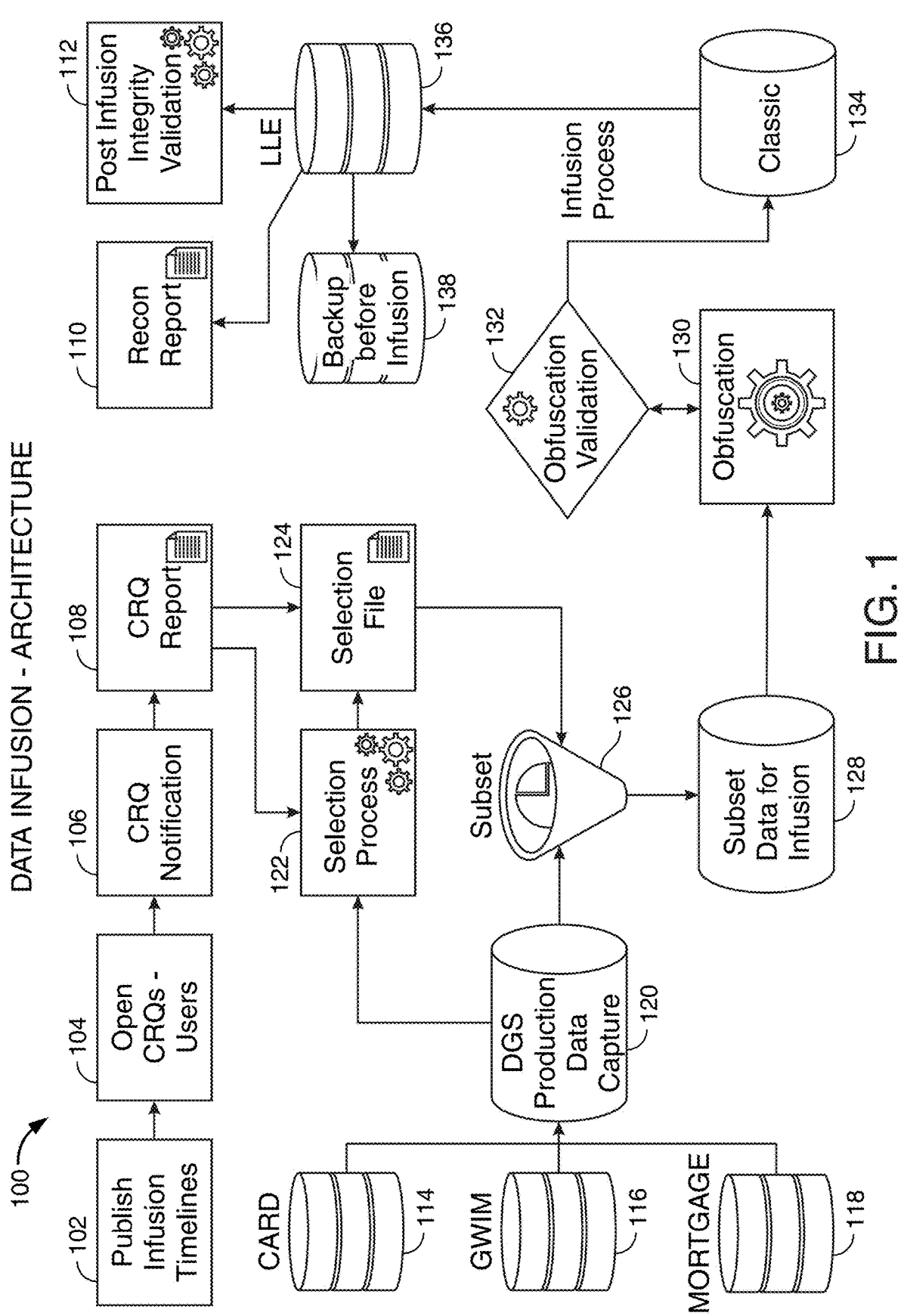
FIG. 1 shows an illustrative flowchart in accordance with principles of the disclosure.

Systems and methods are provided for nondestructive infusion of test data into an LLE. The systems and methods may use artificial intelligence ("AI") and/or machine learning ("ML").

The systems and methods may infuse test data into an LLE, meeting any test data requirements and new business scenarios, and without disrupting the existing system, thus ensuring data integrity and maintaining data quality.

The systems and methods may include data capture. The systems and methods may include a data gateway services ("DGS") production data capture. The data capture may be done directly from a production environment. The data capture may be done from a user profile database. The data capture may be done at the DGS production data capture.

The systems and methods may support data shortage scenarios. The systems and methods may satisfy test scenarios. The systems and methods may support entity business needs by ensuring that, e.g., existing test data, regression scripts, testing windows, and data retrofits are not impacted by test data infusion into the LLE.

LLEs may contain sample data and configurations. LLEs often rely on subsets and/or sanitized test data for testing. Upper-level environments and/or production environments may incorporate actual and/or realistic data sets and/or configurations to mimic production conditions accurately. An LLE may be at least one level removed from a production level.

The systems and methods may include a selection process. The selection process may use AI and/or ML to intelligently apply and identify customer preferences. The systems and methods may produce pre-selection criteria based on user behavior and subscription history. The systems and methods may reduce refresh time efficiently.

The systems and methods may leverage AI/ML to learn user behavior and entity process routines. The systems and methods may leverage AI/ML to contextualize selection criteria for new products and accounts that an entity creates. The systems and methods may be operable to enable an operational expenditure ("OPEX") opportunity. The systems and methods may make a data infusion process, e.g., cheaper, faster, and improved.

The systems and methods may be operable to prepare a selection file based on user requirements for data infusion. The systems and methods may be operable to maintain data integrity across a user profile database.

The systems and methods may provide a zero-touch end-to-end "secure-by-design" data infusion pipeline process. The systems and methods may be operable to select data for automatic obfuscation and provisioning to the requesting system without adding any time or process lag.

The systems and methods may be executed ad-hoc. The systems and methods may be executed at any frequency.

The systems and methods may provide a nondestructive infusion of test data into an LLE. The nondestructive infusion for implementing a test data refresh may be in response to test data refresh requests ("TDRRs").

The systems and methods may include a data infusion processor ("DIP"). The DIP may be operable to process TDRRs.

The systems and methods may include an AI/ML processor. The AI/ML processor may be operable to, e.g., decision, obfuscate, and validate test data.

The systems and methods may include a user profile database. The user profile database may be operable to store user profile data.

The systems and methods may include a backup database. The backup database may be operable to store test data and data tables.

The systems and methods may be operable to receive, via the DIP, TDRRs from a test data unit ("TDU"). The TDRRs may include requests for test data from the user profile database for infusion into the LLE. The LLE may be removed from a production environment. The LLE may be removed from the production environment by at least one level. The infusion may occur in conformance with infusion timelines.

The systems and methods may be operable to publish, via the DIP, the infusion timelines. The infusion timelines may include potential times for the infusion of the test data into the LLE in response to the TDRRs.

The systems and methods may be operable to open, via the DIP, a change request queue ("CRQ"). The CRQ may be a queue including a list of actual time slots for the infusion of the test data into the LLE according to the infusion timelines. The systems and methods may be operable to consolidate a plurality of CRQs into a single CRQ.

The systems and methods may be operable to receive, via the DIP, from the user profile database in response to the TDRRs. The systems and methods may be operable to receive the requested data at the DGS production data capture.

The systems and methods may be operable to filter, via the AI/ML processor, the requested test data by a selection process. The selection process may be operable to use AI and ML to identify selected test data.

The systems and methods may be operable to execute, via the AI/ML processor, obfuscation of the selected test data. The obfuscation may remove personally identifiable information ("PII") from the selected test data.

The systems and methods may be operable to validate, via the AI/ML processor, the obfuscation of the selected test data. The systems and methods may be operable to validate the obfuscation by testing, via the TDU, the selected test data for absence of PII.

The systems and methods may be operable to send, via the DIP, the selected test data to a classic data architect platform. The classic data architect platform may map data tables to the selected test data.

The systems and methods may be operable to store, via the DIP, the data tables and the selected test data on the backup database. An entity, e.g., the TDU, may have access to the backup database.

The systems and methods may be operable to infuse, via the DIP, the data tables into the LLE. The systems and methods may be operable to validate, via the AI/ML processor, the data tables. The systems and methods may be operable to validate the data tables by testing, via the TDU, the data tables in the LLE. The systems and methods may be operable to validate the data tables by matching the TDRRs to the data tables. The systems and methods may be operable to validate, via the AI/ML processor, infused data by post-infusion integrity validation.

The selection process may be operable to use AI and ML to identify, e.g., data processes, user profiles, and systems of record from the user profile database, based on the TDRRs. The selection process may be operable to use AI and ML to identify the selected test data, based on the, e.g., data processes, user profiles, and systems of record.

The systems and methods may include selected test data. The systems and methods may include infusion timelines. The selected test data may include the infusion timelines. The infusion timelines may include timelines for periodic data infusion of the data tables.

The systems and methods may include TDRRs. The TDRRs may include at least some of the selected test data.

The systems and methods may include a user profile database. The user profile data may include, e.g., credit card data, mortgage data, and global wealth investment management data.

The systems and methods may include an LLE. The LLE may be located within the user profile database. The LLE may be a level or more removed from a production level.

The systems and methods may be operable to take less than a threshold of time, e.g., 1 month. The systems and methods may be operable to take less than, e.g., 1 month between the steps of (1) receiving, via the DIP, the TDRRs from the TDU and (2) validating, via the AI/ML processor, the data tables by testing, via the TDU, the data tables in the LLE and matching the TDRRs to the data tables. The systems and methods may be operable to take less than any other threshold of time, e.g., 1 week, 1 day, and 1 hour.

The systems and methods may include no user profile data in the user profile database being destroyed before the infusion of the data tables into the LLE. The systems and methods may include no user profile data in the user profile database being destroyed during or after the infusion of the data tables into the LLE.

The systems and methods may be operable to produce, via the DIP, CRQ notifications. The CRQ notifications may notify the TDU of the CRQs.

The systems and methods may be operable to produce, via the DIP, a CRQ report. The CRQ report may include, e.g., the TDRRs and the infusion timelines.

The systems and methods may be operable to produce, via the DIP, a recon report. The recon report may include, e.g., the test data and plans for additional testing of the test data by the TDU. The systems and methods may be operable to send, via the DIP, the recon report to the TDU.

Systems and methods described herein are illustrative. Systems and methods in accordance with this disclosure will now be described in connection with the figures, which form a part hereof. The figures show illustrative features of system and method steps in accordance with the principles of this disclosure. It is understood that other embodiments may be utilized, and that structural, functional, and procedural modifications may be made without departing from the scope and spirit of the present disclosure.

FIG. 1 shows an illustrative flowchart of the methods and systems in accordance with principles of the disclosure. FIG. 1 shows data infusion-architecture 100. Data infusion—architecture 100 shows process steps of a nondestructive system and method for infusion of test data into an LLE.

The methods and systems may publish infusion timelines 102. The methods and systems may be operable to publish infusion timelines 102, via the DIP. The infusion timelines may include potential times for the infusion of the test data into the LLE in response to TDRRs. This publishing may inform the system about potential times for data infusion.

Following that step, the systems and methods may open CRQs 104 for users. A CRQ may be a queue that tells the system of the actual time slots available for data infusion. The systems and methods may open CRQs 104, via the DIP. The CRQ may be a queue including a list of actual time slots for the infusion of the test data into the LLE according to the infusion timelines.

Then, CRQ notification 106 may notify the TDU about when the system may perform the data infusions. Following that step, a CRQ report 108 may be filed. The CRQ report 108 may include the infusion timelines and the CRQ notification 106.

Following that step, the systems and methods may receive, via the DIP, TDRRs from a TDU. The TDRRs may include requests for test data from a user profile database, e.g., a credit card database, CARD 114, a global wealth investment management database, GWIM 116, and a mortgage database, MORTGAGE 118 for infusion into the LLE. The LLE may be at least one level (e.g., one level, two levels, three levels, etc.) removed from a production environment. The infusion may occur in conformance with the infusion timelines.

Then, the systems and methods may receive the TDRRs at a DGS Production Data Capture 120. The systems and methods may receive, via the DIP at a data gateway services ("DGS") production data capture, requested test data from the user profile database. The requested test data may be received at the DGS Production Data Capture 120, e.g., in response to the TDRRs. For example, the requested test data may be captured by the DGS Production Data Capture 120 based on the requests for data provided in the TDRRs.

The systems and methods may then execute a selection process 122. The systems and methods may be operable to filter, via the AI/ML processor, the requested test data by selection process 122. The selection process 122 may be operable to use AI and ML to identify selected test data.

The systems and methods may then produce a selection file 124. The systems and methods may be operable to prepare the selection file 124 based on user requirements for data infusion. The systems and methods may be operable to maintain data integrity across the user profile database.

The systems and methods may then produce a subset 126. The systems and methods may be operable to prepare a subset 126 of data. The subset 126 of data may be based on additional user requirements for data infusion.

The systems and methods may then execute a subset data for infusion 128. The systems and methods may be operable to prepare the subset data for infusion 128.

The systems and methods may then execute an obfuscation 130. The systems and methods may be operable to execute, via the AI/ML processor, the obfuscation 130 of the selected test data. The obfuscation 130 may remove personally identifiable information ("PII") from the selected test data.

The systems and methods may then execute an obfuscation validation 132. The systems and methods may be operable to execute the obfuscation validation 132, via the AI/ML processor, of the selected test data. The systems and methods may be operable to execute the obfuscation validation 132 by testing, via the TDU, the selected test data for absence of PII.

The systems and methods may then execute a backup before infusion 138. The systems and methods may be operable to store, via the DIP, the data tables and the selected test data on the backup database, via the backup before infusion 138. An entity, e.g., the TDU, may have access to the backup database.

The systems and methods may then send the test data to a classic 134 data architect platform. The systems and methods may be operable to send, via the DIP, the selected test data to the classic 134 data architect platform. The classic 134 data architect platform may map data tables to the selected test data.

The systems and methods may then initiate an infusion process. The systems and methods may infuse the test data into LLE 136.

The systems and methods may then execute post-infusion integrity validation 112. The systems and methods may be operable to validate, via the AI/ML processor, the data tables by the post-infusion integrity validation 112. The post-infusion integrity validation 112 may include testing, via the TDU, the data tables in the LLE. The post-infusion integrity validation 112 may include matching the TDRRs to the data tables.

The systems and methods may then produce a recon report 110. The systems and methods may be operable to produce, via the DIP, the recon report 110. The recon report 110 may include, e.g., the test data and plans for additional testing of the test data by the TDU. The systems and methods may be operable to send, via the DIP, the recon report 110 to the TDU.

Figure 2:
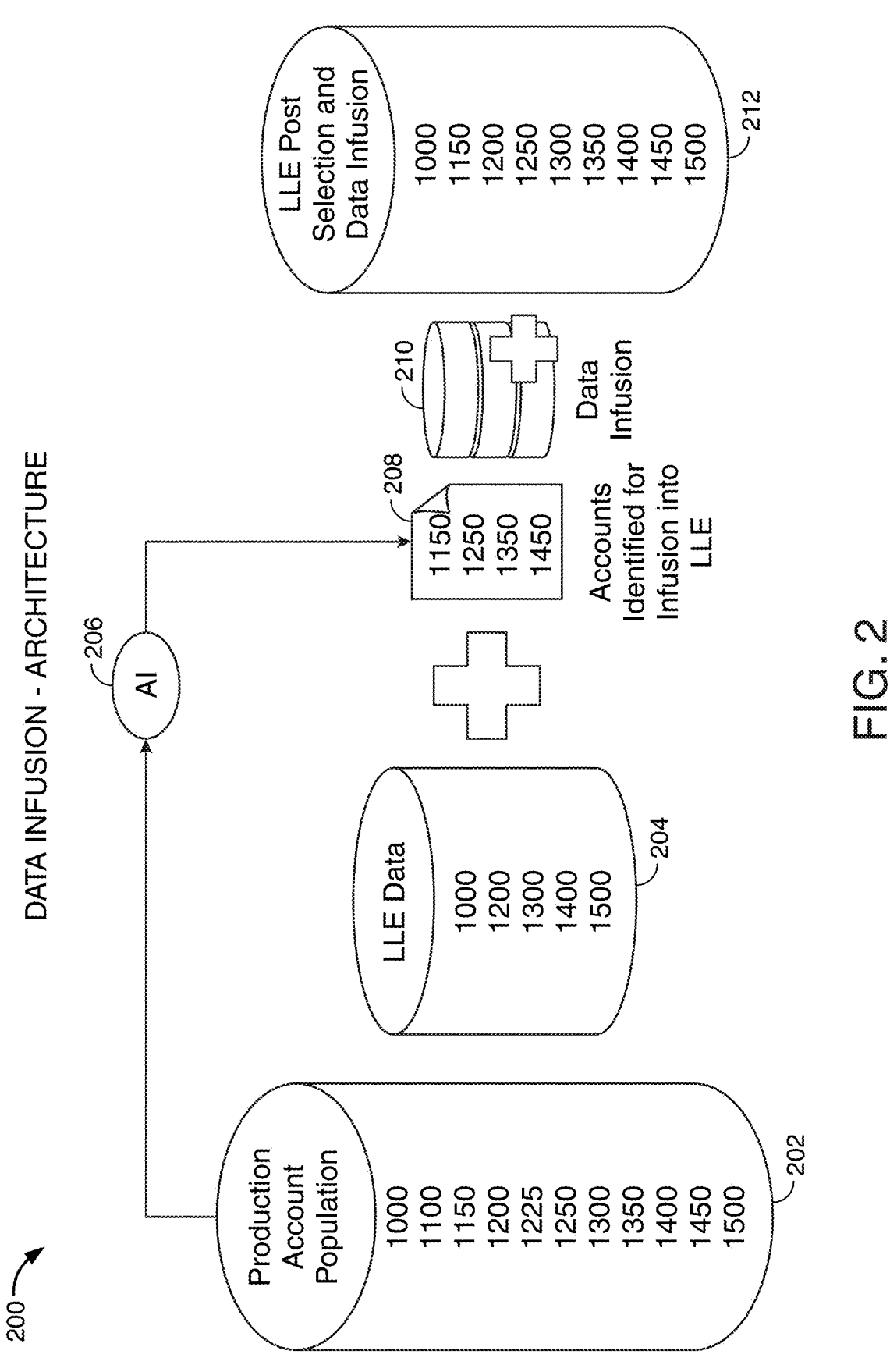
FIG. 2 shows an illustrative diagram in accordance with principles of the disclosure.

FIG. 2 shows an illustrative diagram in accordance with principles of the disclosure. The illustrative diagram includes data infusion—architecture 200. Data infusion—architecture 200 shows process steps of a nondestructive system and method for infusion of test data into an LLE.

The systems and methods may include production account population 202. Production account population 202 may be, e.g., a user profile database. Production account population 202 may include the following data, e.g., accounts 1000, 1100, 1150, 1200, 1225, 1250, 1300, 1350, 1400, 1450, and 1500.

The systems and methods may include LLE data 204. LLE data 204 may include the following data, e.g., accounts 1000, 1200, 1300, 1400, and 1500.

The systems and methods may include AI 206. AI 206 may be, e.g., an AI and/or ML processor. The systems and methods may be operable to receive test data from production account population 202 at AI 206. AI 206 may select and/or identify data, e.g., accounts, for infusion into the LLE. AI 206 may select and/or identify data, e.g., accounts, for infusion into the LLE based on TDRRs.

Accounts identified for infusion into LLE 208 may include the following data, e.g., accounts 1150, 1250, 1350, and 1450. Data infusion 210 may infuse data, e.g., accounts identified for infusion into LLE 208, into LLE data 204.

After data infusion 210, the systems and methods may include LLE post-selection and data infusion 212. LLE post-selection and data infusion 212 may include the following data, e.g., accounts 1000, 1150, 1200, 1300, 1350, 1400, 1450, and 1500. Note that post-data infusion 210, in the disclosed example, accounts 1100 and 1225 are not infused from the production level (e.g., user profile database). This is because those accounts 1100 and 1225 were not identified and/or selected by AI 206 during the infusion selection process.

Figure 3:
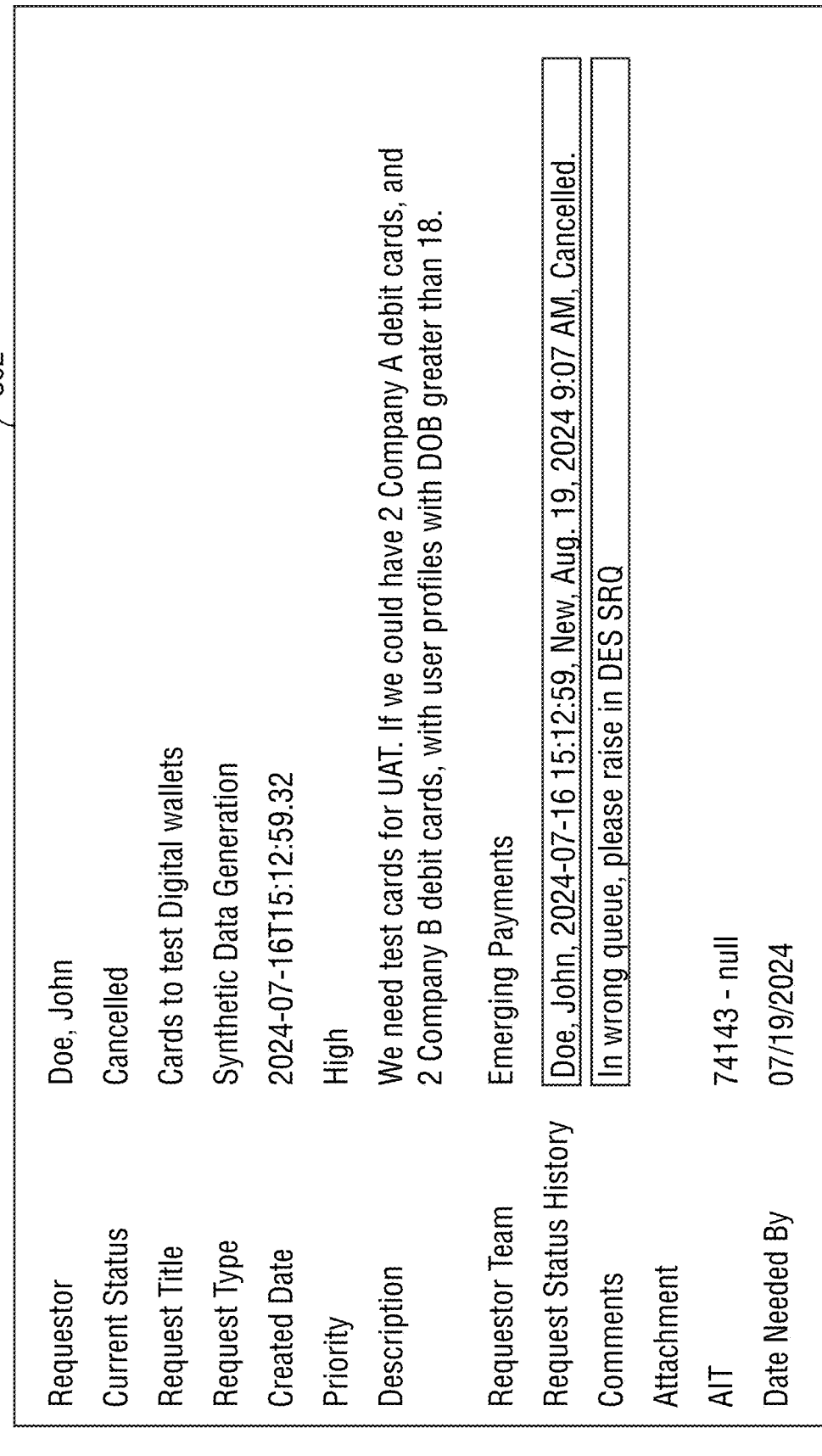
FIG. 3 shows another illustrative diagram in accordance with principles of the disclosure.

FIG. 3 shows an illustrative diagram 300 of an exemplary TDRR 302, in accordance with principles of the disclosure.

TDRR 302 may include a requestor (e.g., John Doe). TDRR 302 may include a current status (e.g., cancelled). TDRR 302 may include a request title (e.g., cards to test digital wallets).

TDRR 302 may include a request type (e.g., synthetic data generation). TDRR 302 may include a created date (e.g., 2024Jul. 16T15:12:59.32).

TDRR 302 may include a priority (e.g., high). TDRR 302 may include a description (e.g., we need test cards for user acceptance testing ("UAT"). If we could have 2 Company A debit cards, and 2 Company B debit cards, with user profiles with dates of birth ("DOB") greater than 18).

TDRR 302 may include a requestor team (e.g., emerging payments). TDRR 302 may include a request status history (e.g., Doe, John, 2024Jul. 16 15:12:59, New, Aug. 19, 2024 9:07 AM, Cancelled.).

TDRR 302 may include comments (e.g., in wrong queue, please raise in data encryption standard ("DES") shared receive queue ("SRQ")). TDRR 302 may include an attachment. TDRR 302 may include an automatic identification tracker ("AIT") (e.g., 74143 —null). TDRR 302 may include a date needed by (e.g., Jul. 19, 2024).

Figure 4:
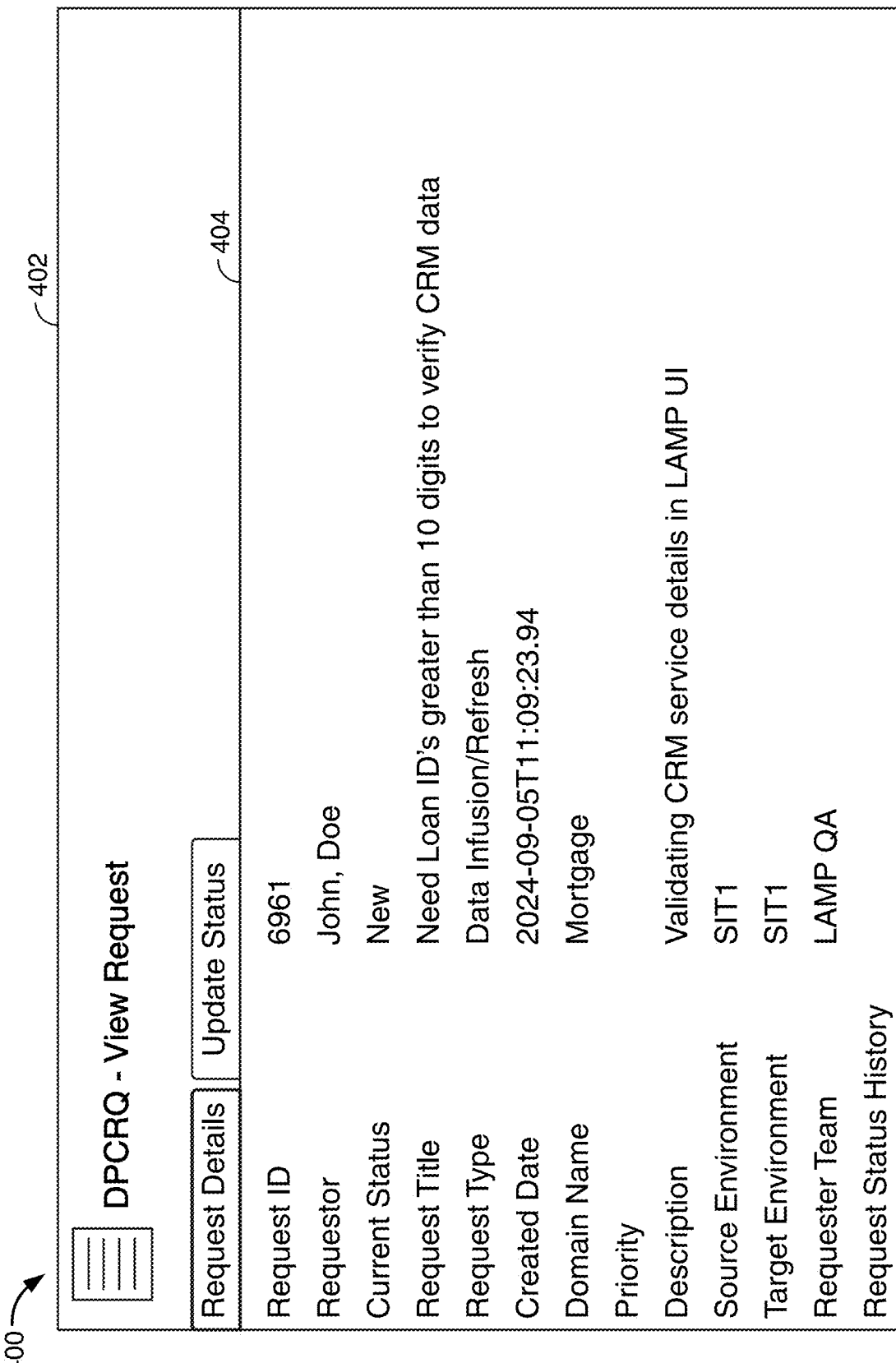
FIG. 4 shows yet another illustrative diagram in accordance with principles of the disclosure.

FIG. 4 shows an illustrative diagram 400 of an exemplary TDRR 402, in accordance with principles of the disclosure.

TDRR 402 may include a direct production change request queue ("DPCRQ")—View Request. The DPCRQ may be a CRQ. TDRR 402 may include a "Request Details" tab 404. TDRR 402 may include an "Update Status" tab.

TDRR 402 may include a request ID (e.g., 6961). TDRR 402 may include a requestor (e.g., John Doe). TDRR 402 may include a current status (e.g., new). TDRR 402 may include a request title (e.g., need Loan ID's greater than 10 digits to verify customer relationship management ("CRM") data).

TDRR 402 may include a request type (e.g., data infusion/refresh). TDRR 402 may include a created date (e.g., 2024Sep. 05T11:09:23.94).

TDRR 402 may include a domain name (e.g., mortgage). TDRR 402 may include a priority (e.g., none). TDRR 402 may include a description (e.g., validating CRM service details in LAMP user interface ("UI")).

TDRR 402 may include a source environment (e.g., SIT1). TDRR 402 may include a target environment (e.g., SIT1). The source environment may be the same as the target environment. The source environment may be different from the target environment.

TDRR 402 may include a requestor team (e.g., LAMP quality assurance ("QA")). TDRR 402 may include a request status history (e.g., none).

Figure 5:
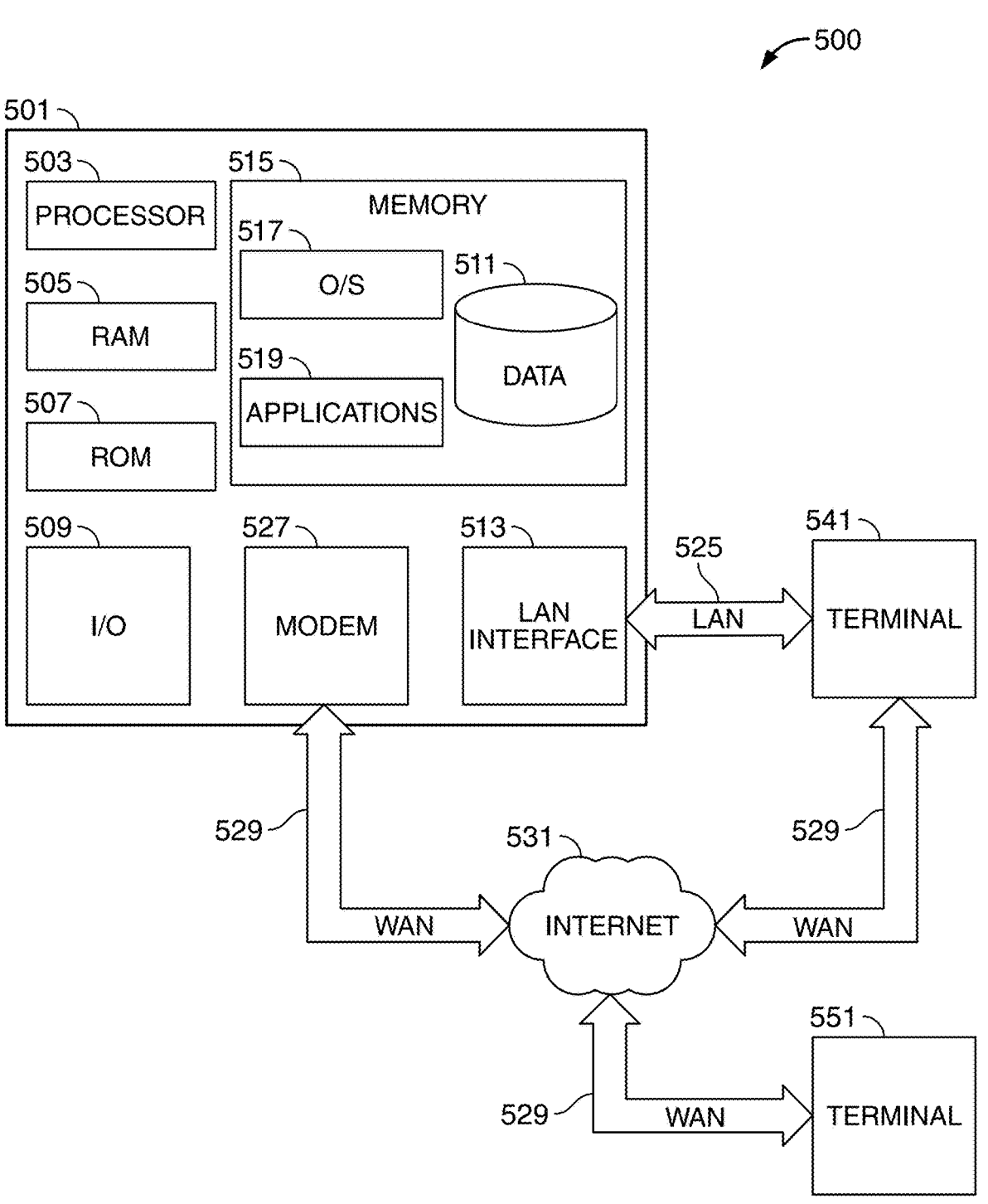
FIG. 5 shows a schematic diagram in accordance with principles of the disclosure.

FIG. 5 shows an illustrative block diagram of system 500 that includes computer 501. Computer 501 may alternatively be referred to herein as a "server" or a "computing device." Computer 501 may be a workstation, desktop, laptop, tablet, smart phone, or any other suitable computing device. Elements of system 500, including computer 501, may be used to implement various aspects of the systems and methods disclosed herein.

Computer 501 may have a processor 503 for controlling the operation of the device and its associated components, and may include RAM 505, ROM 507, input/output module

509, and a memory 515. The processor 503 may also execute all software running on the computer—e.g., the operating system and/or voice recognition software. Other components commonly used for computers, such as EEPROM or Flash memory or any other suitable components, may also be part of the computer 501.

Memory 515 may be comprised of any suitable permanent storage technology—e.g., a hard drive. Memory 515 may store software including the operating system 517 and application(s) 519 along with any data 511 needed for the operation of the system 500. Memory 515 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). Computer 501 may execute the instructions embodied by the software to perform various functions.

Input/output ("I/O") module may include connectivity to a microphone, keyboard, touch screen, mouse, and/or stylus through which a user of computer 501 may provide input. The input may include input relating to cursor movement. The input may relate to database backup, search, and recovery. The input/output module may also include one or more speakers for providing audio output and a video display device for providing textual, audio, audiovisual, and/or graphical output. The input and output may be related to computer application functionality. The input and output may be related to database backup, search, and recovery.

System 500 may be connected to other systems via a local area network ("LAN") interface 513.

System 500 may operate in a networked environment supporting connections to one or more remote computers, such as terminals 541 and 551. Terminals 541 and 551 may be personal computers or servers that include many, or all the elements described above relative to system 500. The network connections depicted in FIG. 5 include a LAN 525 and a wide area network ("WAN") 529 but may also include other networks. When used in a LAN networking environment, computer 501 is connected to LAN 525 through a LAN interface or adapter 513. When used in a WAN networking environment, computer 501 may include a modem 527 or other means for establishing communications over WAN 529, such as Internet 531.

It will be appreciated if the network connections shown are illustrative and other means of establishing a communications link between computers may be used. The existence of various well-known protocols such as TCP/IP, Ethernet, FTP, HTTP, and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 519, which may be used by computer 501, may include computer executable instructions for invoking user functionality related to communication, such as e-mail, Short Message Service (SMS), and voice input and speech recognition applications. Application program(s) 519 (which may be alternatively referred to herein as "plugins," "applications," or "apps") may include computer executable instructions for invoking user functionality related performing various tasks. The various tasks may be related to database backup, search, and recovery.

Computer 501 and/or terminals 541 and 551 may also be devices including various other components, such as a battery, speaker, and/or antennas (not shown).

Terminal 551 and/or terminal 541 may be portable devices such as a laptop, cell phone, Blackberry TM, tablet, smartphone, or any other suitable device for receiving, storing, transmitting and/or displaying relevant information. Terminals 551 and/or terminal 541 may be other devices. These devices may be identical to system 500 or different. The differences may be related to hardware components and/or software components.

Any information described above in connection with database 511, and any other suitable information, may be stored in memory 515. One or more of applications 519 may include one or more algorithms that may be used to implement features of the disclosure, and/or any other suitable tasks.

The disclosure may be operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, etc., that perform tasks or implement abstract data types. The disclosure may also be practiced in distributed computing environments where tasks are performed by remote processing devices that are linked through a communications network. In a distributed computing environment, program modules may be in both local and remote computer storage media including memory storage devices.

Figure 6:
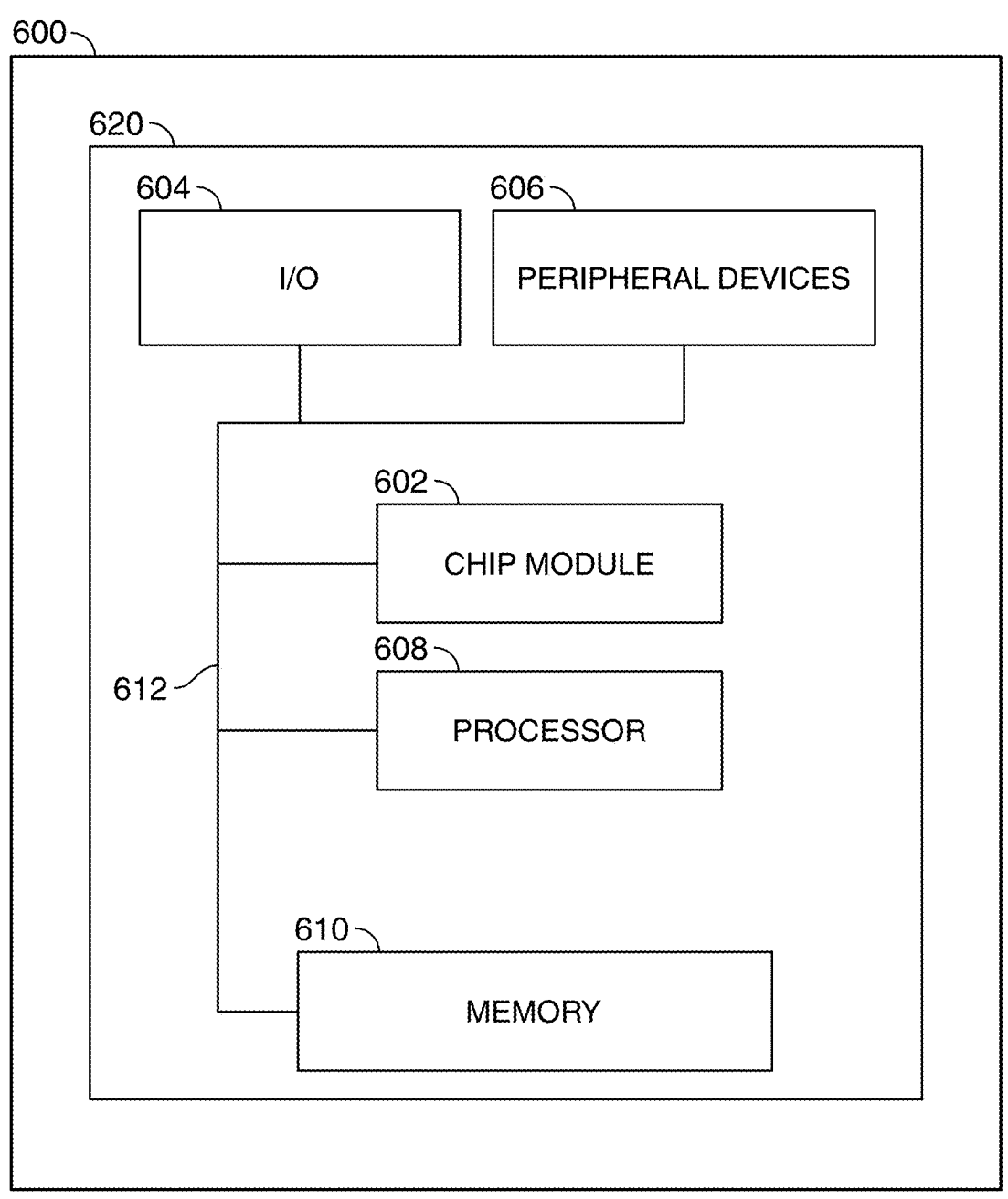
FIG. 6 shows another schematic diagram in accordance with principles of the disclosure.

FIG. 6 shows illustrative apparatus 600 that may be configured in accordance with the principles of the disclosure. Apparatus 600 may be a computing machine. Apparatus 600 may include one or more features of the apparatus shown in FIG. 5. Apparatus 600 may include chip module 602, which may include one or more integrated circuits, and which may include logic configured to perform any other suitable logical operations.

Apparatus 600 may include one or more of the following components: I/O circuitry 604, which may include a transmitter device and a receiver device and may interface with fiber optic cable, coaxial cable, telephone lines, wireless devices, PHY layer hardware, a keypad/display control device or any other suitable media or devices; peripheral devices 606, which may include counter timers, real-time timers, power-on reset generators or any other suitable peripheral devices; logical processing device 608, which may compute data structural information and structural parameters of the data; and machine-readable memory 610.

Machine-readable memory 610 may be configured to store in machine-readable data structures: machine executable instructions (which may be alternatively referred to herein as "computer instructions" or "computer code"), applications, signals, and/or any other suitable information or data structures.

Components 602, 604, 606, 608 and 610 may be coupled together by a system bus or other interconnections 612 and may be present on one or more circuit boards such as 620. In some embodiments, the components may be integrated into a single chip. The chip may be silicon-based.

The steps of methods and systems may be performed in orders beyond the order shown and/or described herein. Embodiments may omit steps shown and/or described in connection with illustrative methods. Embodiments may include steps that are neither shown nor described in connection with illustrative methods.

Illustrative methods and systems steps may be combined. For example, an illustrative method may include steps shown in connection with another illustrative method.

Methods and systems may omit features shown and/or described in connection with illustrative methods and systems. Embodiments may include features that are neither shown nor described in connection with the illustrative methods and systems. Features of illustrative methods and systems may be combined. For example, an illustrative embodiment may include features shown in connection with another illustrative embodiment.

The drawings show illustrative features of methods and systems in accordance with the principles of the disclosure. The features are illustrated in the context of selected embodiments. It will be understood that features shown in connection with one of the embodiments may be practiced in accordance with the principles of the disclosure along with features shown in connection with another of the embodiments.

One of ordinary skill in the art will appreciate that the steps shown and described herein may be performed in other ways and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for nondestructive infusion of test data into an LLE are provided. Persons skilled in the art will appreciate that the present disclosure can be practiced in other ways. The described embodiments are presented for purposes of illustration—not limitation—and the present disclosure is limited only by the claims that follow.

What is claimed is:

1. A system for nondestructive infusion of test data into a lower-level, networked, environment ("LLE") for supporting connections to one or more remote computers, said nondestructive infusion for implementing a test data refresh in response to test data refresh requests ("TDRRs"), the system comprising:

a hardware data infusion processor ("DIP") that processes TDRRs;

a hardware artificial intelligence/machine learning ("AI/ML") processor that obfuscates and validates selected test data;

a user profile database that stores user profile data; and a backup database that stores test data and data tables;

wherein the system:

receives, via the DIP, TDRRs from a test data unit ("TDU"), the TDRRs including requests for test data from the user profile database for infusion into the LLE, the LLE being at least one level removed from a production environment, and the infusion occurring in conformance with infusion timelines;

publishes, via the DIP, the infusion timelines, the infusion timelines including potential times for the infusion of the test data into the LLE in response to the TDRRs;

opens, via the DIP, a change request queue ("CRQ"), the CRQ being a queue including a list of actual time slots for the infusion of the test data into the LLE according to the infusion timelines;

receives, via the DIP at a data gateway services ("DGS") production data capture, requested test data from the user profile database in response to the TDRRs;

filters, via the AI/ML processor, the requested test data by a selection process, the selection process using the AI/ML processor to identify selected test data;

executes, via the AI/ML processor, obfuscation of the selected test data, the obfuscation removing personally identifiable information ("PII") from the selected test data;

validates, via the AI/ML processor, the obfuscation of the selected test data by testing, via the TDU, the selected test data for absence of PII;

sends, via the DIP, the selected test data to a data architect platform, the data architect platform mapping data tables to the selected test data;

stores, via the DIP, the data tables and the selected test data on the backup database, the TDU having access to the backup database;

infuses, via the DIP, the data tables into the LLE; and validate, via the AI/ML processor, the data tables by testing, via the TDU, the data tables in the LLE and matching the TDRRs to the data tables.

2. The system of claim 1 wherein the selection process using the AI/ML processor to:

identify data processes, user profiles, and systems of record from the user profile database, based on the TDRRs; and identify the selected test data, based on the data processes, user profiles, and systems of record.

3. The system of claim 1 wherein the selected test data comprises the infusion timelines.

4. The system of claim 1 wherein the infusion timelines include timelines for periodic data infusion of the data tables.

5. The system of claim 1 wherein the TDRRs comprise at least some of the selected test data.

6. The system of claim 1 wherein the user profile database comprises credit card data, mortgage data, and global wealth investment management data.

7. The system of claim 1 wherein the LLE is located within the user profile database.

8. The system of claim 1 wherein the system takes less than 1 month between:

receiving, via the DIP, the TDRRs from the TDU; and validating, via the AI/ML processor, the data tables by testing, via the TDU, the data tables in the LLE and matching the TDRRs to the data tables.

9. The system of claim 1 wherein no user profile data in the user profile database is destroyed before the infusion of the data tables into the LLE.

10. The system of claim 1 wherein no user profile data in the user profile database is destroyed during or after the infusion of the data tables into the LLE.

11. A method for nondestructive infusion of test data into a lower-level, networked, environment ("LLE") for supporting connections to one or more remote computers, said nondestructive infusion for implementing a test data refresh in response to test data refresh requests ("TDRRs"), the method comprising:

receiving, via a hardware data infusion processor ("DIP"), TDRRs from a test data unit ("TDU"), the TDRRs including requests for test data from a user profile database for infusion into the LLE, the LLE being at least one level removed from a production environment, and the infusion occurring in conformance with infusion timelines;

publishing, via the DIP, the infusion timelines, the infusion timelines including potential times for the infusion of the test data into the LLE in response to the TDRRs;

opening, via the DIP, a change request queue ("CRQ"), the CRQ being a queue including a list of actual time slots for the infusion of the test data into the LLE according to the infusion timelines;

receiving, via the DIP at a data gateway services ("DGS") production data capture, requested test data from the user profile database in response to the TDRRs;

filtering, via a hardware artificial intelligence/machine learning ("AI/ML") processor, the requested test data by a selection process, the selection process using the AI/ML processor to identify selected test data;

executing, via the AI/ML processor, obfuscation of the selected test data, the obfuscation removing personally identifiable information ("PII") from the selected test data;

validating, via the AI/ML processor, the obfuscation of the selected test data by testing, via the TDU, the selected test data for absence of PII;

sending, via the DIP, the selected test data to a data architect platform, the data architect platform mapping data tables to the selected test data;

storing, via the DIP, the data tables and the selected test data on a backup database, the TDU having access to the backup database;

infusing, via the DIP, the data tables into the LLE; and validating, via the AI/ML processor, the data tables by testing, via the TDU, the data tables in the LLE and matching the TDRRs to the data tables.

12. The method of claim 11, wherein the selection process using the AI/ML processor to:

identify data processes, user profiles, and systems of record from the user profile database, based on the TDRRs; and identify the selected test data, based on the data processes, user profiles, and systems of record.

13. The method of claim 11 wherein the selected test data comprises the infusion timelines.

14. The method of claim 11 wherein the infusion timelines include timelines for periodic data infusion of the data tables.

15. The method of claim 11 wherein the TDRRs comprise at least some of the selected test data.

16. The method of claim 11 wherein the user profile database comprises credit card data, mortgage data, and global wealth investment management data.

17. The method of claim 11 wherein the LLE is located within the user profile database.

18. The method of claim 11 wherein the method takes less than 1 month between: receiving, via the DIP, the TDRRs from the TDU; and validating, via the AI/ML processor, the data tables by testing, via the TDU, the data tables in the LLE and matching the TDRRs to the data tables.

19. The method of claim 11 wherein no user profile data in the user profile database is destroyed before infusing the data tables into the LLE.

20. The method of claim 11 wherein no user profile data in the user profile database is destroyed during or after infusing the data tables into the LLE.

* * * * *